United States Patent
Cai et al.

(10) Patent No.: US 6,693,057 B1
(45) Date of Patent: *Feb. 17, 2004

(54) WATER GAS SHIFT CATALYST

(75) Inventors: Yeping Cai, Louisville, KY (US); Sally L. Davies, Louisville, KY (US); Jon P. Wagner, Louisville, KY (US)

(73) Assignee: Sud-Chemie Inc., Louisville, KY (US)

( * ) Notice: Subject to any disclaimer, the term of this patent is extended or adjusted under 35 U.S.C. 154(b) by 85 days.

This patent is subject to a terminal disclaimer.

(21) Appl. No.: 10/104,964

(22) Filed: Mar. 22, 2002

(51) Int. Cl.$^7$ .......................... B01J 21/04; B01J 23/06; B01J 23/72

(52) U.S. Cl. .................. 502/84; 502/342; 502/343; 502/345; 502/346; 502/355; 502/344; 502/349; 502/350; 502/351

(58) Field of Search .............. 502/80, 84, 342, 502/343, 345, 346, 355, 344, 349, 350, 351

(56) References Cited

U.S. PATENT DOCUMENTS

| | | | |
|---|---|---|---|
| 1,809,978 A | | 6/1931 | Larson |
| 3,303,001 A | | 2/1967 | Dienes |
| 3,518,208 A | | 6/1970 | Schneider |
| 3,922,337 A | | 11/1975 | Campbell et al. |
| 4,279,781 A | | 7/1981 | Dienes et al. |
| 4,308,176 A | | 12/1981 | Kristiansen |
| 4,596,782 A | * | 6/1986 | Courty et al. ............... 502/302 |
| 4,683,218 A | | 7/1987 | Slaugh |
| 4,711,773 A | | 12/1987 | Mesters et al. |
| 4,835,132 A | | 5/1989 | Sambrook |
| 5,019,547 A | * | 5/1991 | Chaumette et al. ......... 502/342 |
| 5,021,233 A | | 6/1991 | Klier et al. |
| 5,128,307 A | | 7/1992 | Wanjek et al. |
| 5,245,096 A | * | 9/1993 | Derouane et al. ........... 585/419 |
| 5,990,040 A | | 11/1999 | Hu et al. |
| 6,051,163 A | * | 4/2000 | Kumberger et al. ........ 252/373 |
| 6,576,217 B1 | * | 6/2003 | Nojima et al. .............. 423/651 |
| 2002/0051747 A1 | * | 5/2002 | Suzuki et al. ............... 423/656 |

FOREIGN PATENT DOCUMENTS

| | | |
|---|---|---|
| EP | 0 296734 B1 | 12/1988 |
| EP | 1174408 A | 1/2002 |
| GB | 1131631 | 10/1968 |

OTHER PUBLICATIONS

D.S. Newsome, Catal. Rev., 21, p. 275 (1980).

Ginés, M.J.L., et al. "Activity and structure–sensitivity of the water–gas shift reaction over Cu–Zn–Al mixed oxide catalysts," Applied Catalysts A: General 131, pp. 283–296, 295 (1995).

M.J.L. Ginés and C.R. Apesteguia, "Thermal Decomposition of Cu–Based Hydroxycarbonate Catalytic Precursors for the Low–Temperature CO–Shift Reaction," Journal of Thermal Analysis 50, pp. 745–756 (1997).

H. Topsoe and M. Boudart, J. Catal., 31, p. 346 (1973).

J. Van Brakel, et al., Powder Technology, 29, p. 1 (1981).

Figueiredo, R. Tavares, et al. "Spectroscopic evidence of Cu–Al interactions in Cu–Zn–Al mixed oxide catalysts used in CO hydrogenation." Journal of Catalysts, 178, 146–152 (1998).

J.–L. Li, et al., "Enhancement in methanol synthesis activity of a copper/zinc/aluminum oxide catalyst by ultrasonic treatment during the course of the preparation procedure," Applied Catalysts A: General, 139, 87–96 (1996).

R.H. Höppener, et al. "Preparation and Characterization of Stable Copper/Zinc Oxide/ Alumina catalysis for Methanol Synthesis," Applied Catalysis, 25, 109–119 (1986).

F. Cavani, et al., "Hydrotalcite–type Anionic Clays: Preparation, Properties and Application" Catalysis Today, 11, 173–301 (1991).

N. Ray, et al., "Deactivation of Low Temperature Shift Catalyst," J. Res. Inst. Catalysis, Hokkaido Univ., vol. 30, No. 1, pp. 25–38 (1982).

P. Gherardi, et al., "Preparation of Cu–Zn–Al Mixed Hydroxycarbonates Precursors of Catalysts for the Synthesis of ethanol at Low Pressure," Preparation of Catalysts III, 723–733 (1983).

C. Rhodes, et al. "Water–gas shift reaction: finding the mechanistic boundary," Catalysis Today, 43–58 (1995).

C.V. Ovesen, et al., "A Kinetic Model of the Water Gas Shift Reaction," J. of Catalysis, 134, 445–468 (1992).

C. Busetto, et al., "Catalysts for Low–Temperature Methanol Synthesis. Preparation of Cu–Zn–Al Mixed Oxides via Hydrotalcite–like Precursors," J. of Catalysis, 85, 260–266 (1984).

Figueiredo, R. T., et al. "The role of the coprecipitation sequence of salt precursors on the genesis of Cu–Zno–$Al_2O_3$ catalysts. Synthesis, Characterization and Activity for Low Temperature Shift Reaction." Brazilian Journal of Chemical Engineering, vol. 5, No. 02, pp. 168–176 (Jun., 1998).

T. Van Herwijnen, et al., "Kinetics and Mechanism of the CO Shift on Cu/ZnO," Journal of Catalysis, 63, 83–93 (1980).

Jae Sung Lee, et al., "A Comparative Study of Methanol Synthesis from $CO_2/H_2$ and $CO/H_2$ over a $Cu/Zno/Al_2O_3$ Catalysts," Research Center for Catalytic Tech., Pohang Univ. of Science and Tech. (POSTECH) ad Res. Inst. of Ind. Science and Tech. (RIST) (1993).

(List continued on next page.)

Primary Examiner—M. Alexandra Elve
Assistant Examiner—Christina Ildebrando
(74) Attorney, Agent, or Firm—Scott R. Cox; Joan L. Simunic

(57) ABSTRACT

A low temperature copper/zinc/aluminum water gas shift catalyst is described. The catalyst is formed from a precursor, wherein the precursor includes aluminum in the form of hydrotalcite and aluminum separate from the hydrotalcite. A method of making the catalyst and a process for using the catalyst are also described.

28 Claims, 1 Drawing Sheet

OTHER PUBLICATIONS

John G. Nunan, et al., "Methanol Synthesis Catalysts Based on Cs/Cu/ZnO/$M_2O_3$ (M=Al, Cr, Ga): Genesis from Coprecipitated Hydrotalcite–like Precursors, Solid–state Chemistry, Morphology and Stability," *Inorg. Chemistry*, 28, 3868–3874 (1989).

Velu, S.; et al. "Selective production of hydrogen by partial oxidation of methanol over catalysts . . . " Catalysis Letters (1999), 159–167 vol. 62 (2–4).

Velu, S.; et al. "Selective production of hydrogen for fuel cells via oxidative steam reforming of . . . " Applied Catalysis (2001), 47–63, vol. 213(1).

Velu, S.; et al. "Oxidative steam reforming of methanol over CuZnAl (Zr)–oxide catalysts: A new and efficient . . . " Cebmical Communications (1999), 2341–2342.

Hilmen A–M; et al. "Synthesis of higher alcohols on sopper catalysts supported on alkali–promoted . . . " Applied Catalsis A (1998), 355–372 vol. 169(2).

* cited by examiner

WATER GAS SHIFT CATALYST

CROSS REFERENCE TO RELATED APPLICATIONS

NONE

BACKGROUND OF INVENTION

1. Field of Invention

This invention is directed to catalysts useful in the conversion of carbon oxides and the processes utilized to manufacture and use those catalysts. Specifically, the invention is directed to a copper/zinc/aluminum catalyst useful for low temperature water gas shift reactions and processes useful for its manufacture and use.

2. Prior Art

Synthesis gas (syngas, a mixture of hydrogen gas and carbon monoxide) represents one of the most important feedstocks for the chemical industry. It is used to synthesize basic chemicals, such as methanol or oxyaldehydes, as well as for the production of ammonia and pure hydrogen. However, synthesis gas produced by steam reforming of hydrocarbons is typically not suitable for industrial applications because the syngas produced is relatively carbon monoxide rich and hydrogen poor.

In commercial operations, a water gas shift (WGS) reaction (Eq. 1) is used to convert carbon monoxide to carbon dioxide.

$$CO+H_2O \leftrightarrows CO_2+H_2 \quad H=-9.84 \text{ Kcal/mol at } 298° \text{ K.} \quad \text{(Eq. 1)}$$

An added benefit of the WGS reaction is that hydrogen is generated concurrently with the carbon monoxide conversion.

The water gas shift reaction is usually carried out in two stages: a high temperature stage, with typical reaction temperatures of about 350–400° C., and a low temperature stage, with typical reaction temperatures of about 180–240° C. While the lower temperature reactions favor more complete carbon monoxide conversion, the higher temperature reactions allow recovery of the heat of reaction at a sufficient temperature level to generate high pressure steam. For maximum efficiency and economy of operation, many plants contain a high temperature reaction unit for bulk carbon monoxide conversion and heat recovery, and a low temperature reaction unit for final carbon monoxide conversion.

Chromium-promoted iron catalysts are normally used in the first stage high temperature reactions to effect carbon monoxide conversion at temperatures above about 350° C. and to reduce the CO content to about 3–4% (see, for example, D. S. Newsom, Catal. Rev., 21, p. 275 (1980)). As is known from the literature, the chromium oxide promoter serves two functions: it enhances catalytic activity and it acts as a heat stabilizer—increasing the heat stability of magnetite, the active form of the catalyst, and preventing unduly rapid deactivation of the catalyst under conditions of technical use.

The commonly used catalysts for the water gas shift reaction at low temperature ("low temperature shift (LTS) reaction") contain copper oxide, zinc oxide and aluminum oxide. Because these catalysts operate at relatively low temperatures, they generate equilibrium carbon monoxide concentrations of less than about 0.3% in the exit gas stream. However, the performance of the catalyst to effect carbon monoxide conversion and the hydrogen yield gradually decrease during normal operations due to deactivation of the catalyst. This deactivation is caused by poisoning, generally from traces of chloride and sulfur compounds in the feed, or sintering from the hydrothermal environment of the reaction. The rate of the hydrothermal deactivation, in particular, is dependent on reaction conditions such as temperature, steam to gas ratio and composition of the feed gas mixture, and is closely dependent on the formulation and manufacturing process for making the catalyst.

A typical low temperature shift catalyst is comprised of from about 30% to about 70% CuO, from about 20% to about 50% ZnO and from about 5% to about 40% $Al_2O_3$. The catalyst is usually made from a precursor formed through co-precipitation of metal salts (nitrate, sulfate, or acetate), thermal decomposition of metal complexes, or impregnation of metal salt onto a carrier. Depending on the preparation conditions (pH, temperature, addition rate and composition), the precursor may include one or several of the following mixed hydroxycarbonate phases: (a) malachite $Cu_2CO_3(OH)_2$, (b) hydrozincite $Zn_5(CO_3)_2(OH)_6$, (c) rosasite $(Cu, Zn)_2CO_3(OH)_2$, (d) aurichalcite $(Cu, Zn)^5(CO_3)_2(OH)_6$ and (e) hydrotalcite $(Cu, Zn)_6Al_2(OH)_{16}CO_3$. The hydrotalcite is generally present in a hydrated form, such as $(Cu, Zn)_6Al_2(OH)_{16}CO_3 \cdot 4H_2O$. After preparation, the catalyst is washed to remove foreign ions, dried and calcined at an appropriate temperature to form oxides. With appropriate precursors and preparation conditions, a mixed copper/zinc oxide phase rather than segregated cupric oxide and zinc oxide can be formed during calcination at 250–450° C. The catalyst must then be reduced with hydrogen at 100–300° C. before being put on stream. During reduction, copper oxide in cupric form is reduced to either metallic copper or/and cuprous oxide.

The precursor material is an important factor in the preparation of the copper/zinc/aluminum oxide water gas shift catalyst. For example, it has been reported that "CuO/ZnO/$Al_2O_3$ mixed oxides should contain CuO in a finely dispersed phase in order to obtain WGS catalysts exhibiting superior activity. For a given copper loading, the CuO crystallite size in the mixed oxide depends on the hydrotalcite content in the hydroxycarbonate precursor: the higher the hydrotalcite amount in the precursor, the lower the CuO crystallite size in the resulting mixed oxide." (See Ginés, M. J. L., et al. "Activity and structure-sensitivity of the water-gas shift reaction over Cu—Zn—Al mixed oxide catalysts," Applied Catalysis A: General 131, pages 283–296, 295 (1995).) In the Ginés, et al, study, the catalyst which displayed the highest activity was obtained from a catalytic precursor crystallized with a single hydrotalcite-like structure (ibid. at page 291).

While many catalyst compositions have been developed for low temperature water gas shift reactions, improved performance of the catalyst is still sought. In addition, enhancements to the catalyst composition are still necessary to overcome the problems experienced by the prior art catalysts.

Accordingly, an objective of the present invention is an improved catalyst for CO conversion that has superior activity and stability.

It is a further object of the present invention to prepare a catalyst for CO conversion, which catalyst exhibits significant hydrogen production over the lifetime of the catalyst.

It is a still further object of the present invention to disclose an improved low temperature water gas shift catalyst comprising copper, zinc and aluminum.

It is a still further object of the invention to disclose an improved catalyst for CO conversion comprising zinc, aluminum and copper, wherein the catalyst is prepared from a hydroxycarbonate precursor having less than about 60% of the catalyst aluminum in the form of a hydrotalcite, the hydrotalcite being defined as $(Cu, Zn)_6Al_2(OH)_{16}CO_3 \cdot 4H_2O$.

It is a still further object of the invention to disclose an improved LTS catalyst comprising zinc, aluminum and copper, wherein the copper surface area of the catalyst is greater than about 22 $m^2/g$.

It is a still further object of the invention to disclose processes for the use of the improved catalyst.

It is a still further object of the invention to disclose processes for the products of the improved catalysts.

These and other objects can be obtained by the disclosed processes for the preparation and use of a water gas shift catalyst of the invention and the catalysts produced by those processes.

SUMMARY OF THE INVENTION

In accordance with the present invention there is provided an improved low temperature shift copper/zinc/aluminum catalyst which is prepared from a hydroxycarbonate precursor having from about 1% to about 60% of the catalyst aluminum intercalated in a hydrotalcite, wherein the hydrotalcite is defined as $(Cu, Zn)_6Al_2(OH)_{16}CO_3 \cdot 4H_2O$. In an alternative embodiment, the precursor comprises the hydrotalcite having from about 5% to about 45% of the aluminum of the catalyst, and more preferably the hydrotalcite comprises from about 10% to about 45% of the aluminum. In another alternative embodiment, the precursor comprises the hydrotalcite having less than about 90% of the aluminum of the catalyst, and the catalyst has a copper surface area of greater than about 24 $m^2/g$. In another alternative embodiment, up to about 70% of the aluminum is intercalated in the hydrotalcite and the catalyst has a copper surface area of greater than about 22 $m^2/g$.

The invention is also a process for the production of the catalysts prepared from a hydroxycarbonate precursor having a predetermined hydrotalcite content and copper surface area.

The invention is also a process for the conversion of carbon monoxide and water to carbon dioxide and hydrogen at temperatures in the range from about 150° C. to about 350° C. using the catalysts described above.

DETAILED DESCRIPTION OF THE INVENTION

Figure 1:
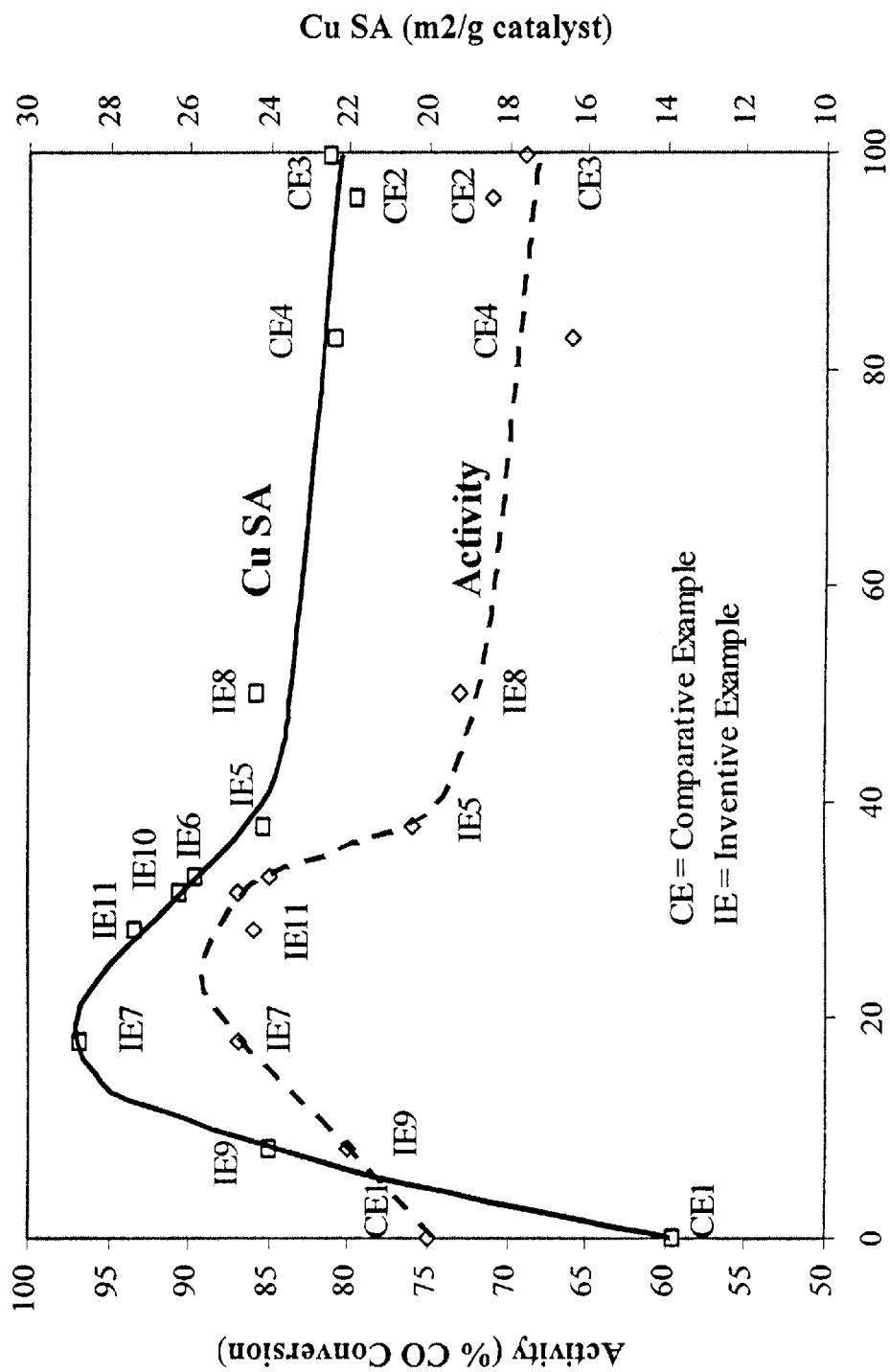
FIG. 1 is a graph comparing the activity and copper surface area of the catalyst with the percentage of aluminum in the hydrotalcite precursor of the catalyst.

An improved low temperature shift catalyst comprising copper, zinc and aluminum is produced from a mixed metal hydroxycarbonate precursor having less than about 60% of the aluminum present in the precursor in the form of hydrotalcite. The resulting catalyst has been surprisingly discovered to be an effective water gas shift catalyst, in contrast to the teachings of the prior art, e.g. Giles et al, that teaches the need for essentially pure hydrotalcite precursors. (For this invention, the term "hydrotalcite" is limited to ternary mixtures of copper, zinc and aluminum with the general structure of $(Cu, Zn)_6Al_2(OH)_{16}CO_3 \cdot 4H_2O$. For this invention, the term "hydrotalcite aluminum" or "HTAl" refers to the concentration of aluminum that is present in the precursor in the form of hydrotalcite divided by the total aluminum concentration of the catalyst.)

In an alternative embodiment, the hydrotalcite aluminum (HTAl) is from about 5% to about 45%, and more preferably from about 10% to about 45%. While the hydrotalcite aluminum (HTAl) of the precursor mix is preferably less than about 60%, low temperature shift catalysts can also be produced from precursors containing hydrotalcite with the hydrotalcite aluminum up to from about 70% to about 90%, although the performance of catalysts produced from precursor materials containing higher percentages of HTAl is generally reduced. Any process which produces precursor material for catalysts wherein the precursor material contains low concentrations of HTAl is believed to fall within the scope of the invention.

Several methods are known in the art which may be utilized to determine the amount of hydrotalcite present in the catalyst precursor, but thermal gravimetric analysis (TGA) is preferably utilized. (See, for example, M. J. L. Ginés and C. R. Apesteguia, "Thermal Decomposition of Cu-Based Hydroxycarbonate Catalytic Precursors for the Low-Temperature CO-Shift Reaction," Journal of Thermal Analysis 50, pages 745–756 (1997), and incorporated herein by reference in its entirety.) In this invention, the amount of aluminum in the hydrotalcite is calculated by the amount of water lost as measured between 90° C. and 180° C. in a standard TGA experiment. The total amount of aluminum present in the catalyst precursor is determined by conventional chemical analysis.

In one method for the preparation of the catalyst of the invention, appropriate quantities of copper salts and zinc salts are mixed with an aluminum component in an aqueous solution to produce a catalyst precursor mixture. The copper salts and zinc salts may be selected from a variety of known metal salts, such as the respective metal nitrates, sulfates, chlorides, acetates, or a combination thereof. The nitrates are recommended. The aluminum component may be prepared by mixing an aluminum salt, such as aluminum nitrate, aluminum sulfate, or a combination thereof, with an alumina, such as bohmite, bayerite, gibbsite or a combination thereof. The concentration of the metal-containing mixture (copper salt, zinc salt and aluminum components) is preferably diluted to from about 5 wt % to about 30 wt %, but may be varied as necessary to produce a catalyst with the appropriate ratio of these elements as discussed later.

During the precursor preparation, the reaction solution is maintained at a temperature of about 40° C. to about 80° C. while maintaining agitation. The solution is then neutralized to a constant pH from about 6 to about 9 with a precipitating agent, such as a carbonate, bicarbonate, or combination thereof. The solution is then stirred and maintained at a temperature from about 40° C. to about 80° C. at a pH from about 6 to 9 until complete precipitation has occurred. The precipitate is then filtered, washed, dried and calcined using conventional procedures as discussed later to form the catalyst of the invention. If the precipitate contains sulfates or chlorides, it should be washed sufficiently to produce a product containing less than about 300 ppm of these materials.

In an alternative process of the invention, the precursor material is prepared by precipitation of the copper and zinc components separately from the aluminum component. In this process, the copper soluble salts and zinc soluble salts are blended in an aqueous solution. These copper and zinc salts may be any conventional metal salts, such as nitrates, sulfates, chlorides, acetates or a combination thereof. The nitrate salts are recommended. The concentration of the metal salts in the solution is preferably from about 5 wt % to about 30 wt %. The precipitating agent for the copper and zinc components can be any conventional precipitating agent, such as a carbonate, a bicarbonate, or a combination thereof. The copper and zinc components are precipitated in a pH range from about 6 to about 9, and at a temperature from ambient temperature to about 80° C. The aluminum component of the precursor material can be prepared by any process which produces an appropriate quantity of alumina as discussed later. For example, the aluminum component may be produced by neutralizing a sodium aluminate solution or a potassium aluminate solution with an acidic material until a pH of about 6 to about 9 is achieved. Some representative acidic materials which may be used include carbon dioxide, nitric oxides, sulfur oxides, or an organic acid, such as acetic acid, citric acid, oxalic acid, or an inorganic acid, such as boric acid, nitric acid, sulfuric acid, hydrochloric acid, phosphoric acid, or salts with acidic properties, such as sodium nitrate or potassium nitrate. The acids may be used in combination as necessary and as reasonable to so combine such as would be known in the art. Alternatively, the aluminum component can be produced by blending an acidic aluminum salt, such as a nitrate, sulfate or acetate with a basic material, such as sodium hydroxide, potassium hydroxide, or various carbonates or bicarbonates, to maintain the pH of the solution between about 6 and about 9. As is known in the art, the aluminum component can also be formed by several methods, such as, but not limited to, reacting alumina with appropriate acids. The aluminum solution is then combined with the copper/zinc solution.

The post treatment of the resulting slurry uses the same process discussed above. Any process that produces a catalyst precursor with concentrations of zinc, copper and aluminum within the required percentages and wherein the HTAl is within the ranges disclosed is within the scope of the invention.

It has been surprisingly discovered that in order to produce the appropriate percentage of aluminum in the form of hydrotalcite in the precursor of the catalyst the aluminum component must be introduced into the solution with the zinc and copper components in the form of both alumina and an ionic aluminum. To form the preferred precursor materials with the preferred concentration of aluminum in the form of hydrotalcite, the ratio of the ionic aluminum to aluminum in the form of alumina must be controlled. The preferred concentration of the alumina that is present in the copper, zinc and aluminum solution utilized to form the precursor of the catalyst ranges from about 30% to greater than about 95%. The remaining portion of the aluminum should be present in the solution in the form of an aluminum cation. The more preferred embodiments of the precursor material are produced when the relative concentration of the alumina is greater than the concentration of the aluminum cation, with the more preferred concentration of the alumina being from about 40% to greater than about 95% and the most preferred concentration being 50% to greater than about 95%.

The resulting precipitate is then dried at a temperature from about 100° C. to about 160° C., calcined at a temperature from about 170° C. to about 500° C., and formed into appropriate shapes. The catalyst may be formed into any conventional product shape, such as a tablet. Preferred methods for the preparation of the catalyst shape include pelletizing or other conventional molding processes to produce catalysts, especially in the form of spheres, pellets, rings, tablets or extruded products formed mostly of solid or hollow objects in order to achieve high geometric surface with simultaneously low resistance to flow. Honeycombs are a particularly preferred shape for the catalysts.

The chemical composition of the catalyst before reductive activation, expressed by weight percentage based on dry weight (no volatile content) after calcination is the following: from about 5% to 70% copper oxide, from about 20% to 50% zinc oxide, and from about 5% to about 50% aluminum oxides. Alternatively, more preferred ranges for the materials are: the copper oxide may be present at from about 30% to about 60%, the zinc oxide at from about 20% to about 50%, and the aluminum oxide at from about 5% to about 20%.

Promoters or stabilizers may also be utilized in the copper/zinc/aluminum low temperature shift catalyst. For example, Group I-A elements in the form of oxides, such as potassium oxide and/or cesium oxide, may be added to the catalyst as a promoter. The amount of the added Group I-A oxide can be varied. A typical concentration would be from about 50 ppm to about 1000 ppm, although significantly higher or lower levels may be used as appropriate to achieve the desired promoter effect.

Elements of Group IV-B may also be used as a promoter/stabilizer for the catalyst. Preferably zirconium and/or titanium are used. It has been discovered that titanium oxide performs better than zirconium oxide as a promoter.

The amount of the promoter/stabilizer utilized in the catalyst should be controlled within certain limitations. In the case of Group IV-B elements (preferably titanium and/or zirconium, most preferably titanium), this level ranges from about 0.1% to about 20%, preferably from about 0.2% to about 10%, depending on the method of preparation. For example, if the promoter is added to the mixture of the metal salts during coprecipitation, the amount of the promoter should be at the higher end of the range, whereas if the promoter is added to the surface of a finished catalyst using an impregnation method, it should be at the lower end of the range. Below this range, insufficient amounts of the promoter are available to react, whereas above this range, the effective copper surface is reduced by the promoter and an insufficient amount of active sites may be available for the reaction. Thus, if an excess amount of the Group IV-B promoter is utilized, the promoting element can behave as a suppressant to the activity of the catalyst.

For Group IV-B elements, the promoter can be prepared from an oxide, hydroxide, chloride, sulfate, isopropoxide or protoxide. Preferably an oxide, hydroxide or sulfate is used. As carbon, chlorine and sulfur are contaminants for the catalyst, a thorough washing of the resulting precipitates (catalyst precursor) and/or ion-exchange is important in preparation of the catalyst. A homogeneous mixture of the promoter and the copromoter with CuO/ZnO ensures an intimate interaction among the components.

The surface area of the catalyst can be defined in terms of a BET surface area. The BET surface area is determined by $N_2$ adsorption according to the single-point method, as described in DIN 66 132. In the present invention, the BET surface area of the catalyst is at least about 40 $m^2/g$ to about 200 $m^2/g$, and, preferably, from about 80 $m^2/g$ to about 140 $m^2/g$.

It has been discovered that the copper surface area of the catalyst of the invention may be substantially greater than that of some prior art catalysts. It has also been surprisingly discovered that catalysts of the invention which have the higher copper surface area exhibit better performance, especially when the percentage of hydrotalcite aluminum present in the catalyst precursor is within the preferred ranges of the invention. The copper surface area of catalysts produced by the process of the invention is greater than about 15 $m^2/g$.

It has also been surprisingly discovered that useful low temperature shift catalysts are produced if the copper surface area is at least about 22 m²/g even when the amount of hydrotalcite aluminum present in the precursor of the catalyst is greater than about 60%. In fact, it has been surprisingly discovered that useful low temperature shift catalysts are produced even when the percentage of hydrotalcite aluminum is as high as 90% if the copper surface area is greater than about 24 m²/g.

While various methods can be used to determine the copper surface area of catalysts, the method of measurement used for the invention is as follows: nitrous oxide in a helium stream is pulsed through a container containing the ground and reduced catalyst at 60° C. until the amount of nitrogen produced is less than 3% of the amount produced when the nitrous oxide is first pulsed. Because copper oxidizes in the presence of nitrous oxide, the amount of nitrogen formed can be utilized to compute the amount of the copper surface area of the catalyst, recognizing that the number of copper atoms present in a square meter is about $1.41 \times 10^{19}$ and that the reaction follows Equation 2:

$$N_2O + 2\ Cu \rightarrow N_2 + Cu_2O \quad \text{(Eq. 2)}$$

While other methods of computing copper surface area may be utilized, those other methods may result in a determination of a copper surface area for a sample which differs from the copper surface area of the catalyst using the above-described method.

The specific pore volume of the catalyst of the invention determined by Hg porosimetry is from about 0.2 cc/g to about 0.4 cc/g. The specific pore volume is determined according to the mercury penetration method described in J. Van Brakel, et al., Powder Technology, 29, p.1 (1981) and incorporated herein in its entirety by reference. In this method, mercury is pressed up to a pressure of about 4000 bar into the catalyst moldings, during which the volume reduction of the mercury is plotted as a function of pressure. A curve is obtained from which the pore distribution can also be determined. According to this mercury penetration method, only the volume and distribution of pores with a diameter of >3.6 nm can be determined.

The catalyst is preferably employed in a process in which carbon monoxide and water are converted in the temperature range between about 150° C. and about 350° C., under pressures from about 1.5 bars to about 70 bars at dry gas space velocity of about 2,000/hr to about 300,000/hr and at a steam to gas ratio of about 0.3 to 2.0.

The catalyst prepared according to this invention makes it possible to carry out the process under the above described conditions of low temperature shift in greater efficiency than the known catalysts. Typically, at least 30% greater activity and 30% longer life are observed, resulting in about 30% higher total $H_2$ production over the lifetime of the catalyst.

Although the catalyst is preferably utilized in a process in which carbon monoxide and water are converted to carbon dioxide and hydrogen, other processes utilizing copper-based catalysts can also be enhanced by use of the catalyst. For example, the catalyst can be used for converting carbon monoxide and/or carbon dioxide to methanol and/or higher alcohols in the presence of hydrogen and other inert gases at temperatures in a range of about 200° C. to 400° C. Further, the catalyst can be used for the removal of traces of oxygen, hydrogen, sulfur, or sulfur compounds, chlorides and/or carbon monoxide from a gas stream. In addition, the catalyst can be used for general hydrogenation processes in which conventional copper-based catalysts are used.

The following examples describe catalysts employed according to the invention:

COMPARATIVE EXAMPLE 1

This Example illustrates the process for preparation of catalyst tablets as disclosed in U.S. Pat. No. 5,990,040, incorporated herein by reference in its entirety, and is presented for comparison to the invention.

A copper salt solution is prepared from 254 grams of copper nitrate which are added to a solution containing 728 grams of a 28% solution of $NH_4OH$ and 316 grams of $NH_4HCO_3$ in about 1221 ml of water. The copper salt solution is stirred vigorously at a temperature from about 70° C. to 78° C. under a fast $O_2/N_2$ gas flow, wherein the concentration of the $O_2$ in the gas mixture is about 10%. A zinc salt solution is prepared in a similar manner wherein 523 grams of zinc nitrate is added to a solution of 1456 grams of $NH_4OH$, 632 grams of $NH_4HCO_3$ and 2620 grams of water. 1973 grams of the copper solution are mixed with 1414 grams of the zinc solution under constant stirring. 80 grams of alumina are blended with the copper/zinc solution in a 14 liter reactor at a temperature of about 77° C. to 85° C. under vigorous stirring. A solid precipitate is produced and is then filtered with a 2 liter Buchner funnel and a 4 liter filtration flask vacuum being provided by a Venturi water suction device. The resulting solids are dried at 150° C. overnight and calcined at 370° C. Catalyst tablets are formed from the precipitate with a size from about 4.76×2.38 mm. Approximately 2% graphite is added to the catalyst materials to assist in the formation of the catalyst shape.

COMPARATIVE EXAMPLE 2

This Example illustrates the coprecipitation method of forming a zinc/copper/aluminum catalyst as described in U.S. Pat. No. 4,279,781, incorporated herein by reference in its entirety, and is presented for comparison to the invention.

A solution is made containing 1394 grams of a 17% copper nitrate solution, 689 grams of an 18% zinc nitrate solution and 681 grams of a 4% aluminum nitrate solution. The solution is blended at 55° C. under constant stirring. A sodium carbonate solution is prepared by adding sodium carbonate to deionized water until saturation is reached. The sodium carbonate solution and the solution of copper, zinc and aluminum nitrate are added to a precipitation tank simultaneously with the pH of the mixture maintained at a constant range of about 7 to 8 during the precipitation process. The temperature of the precipitation tank is maintained at about 60° C. The slurry formed from the solution is stirred for about 30 minutes and then is filtered, washed, dried, calcined and formed into a tablet in the same manner as in Comparative Example 1.

COMPARATIVE EXAMPLE 3

The same process is used as in Comparative Example 2 except that potassium carbonate is used as the precipitating agent.

COMPARATIVE EXAMPLE 4

The process from Comparative Example 2 is followed, except the original copper/zinc/aluminum solution contains 1394 grams of a 17% copper nitrate solution, 689 grams of an 18% zinc nitrate solution, 579 grams of a 4% aluminum nitrate solution and 11 grams of alumina.

INVENTIVE EXAMPLE 5

The process of Comparative Example 2 is followed except the solution of zinc, copper and aluminum is prepared from a solution containing 1394 grams of a 17% copper nitrate solution, 689 grams of an 18% zinc nitrate solution, 479 grams of a 4% aluminum nitrate solution and 22 grams of alumina.

INVENTIVE EXAMPLE 6

The process for the preparation of a catalyst of Inventive Example 5 is followed except the amount of the 4% aluminum nitrate solution is 344 grams and the amount of alumina is 36 grams.

INVENTIVE EXAMPLE 7

The process for the preparation of the catalyst of Inventive Example 5 is followed except the amount of the 4% aluminum nitrate solution is 204 grams and the amount of alumina is 51 grams.

INVENTIVE EXAMPLE 8

The process for the preparation of the catalyst of Inventive Example 5 is followed except the amount of the 4% aluminum nitrate solution is 533 grams and the amount of alumina is 16 grams.

INVENTIVE EXAMPLE 9

The process for the preparation of the catalyst of Inventive Example 5 is followed except the amount of the 4% aluminum nitrate solution is 35 grams and the amount of alumina is 73 grams.

INVENTIVE EXAMPLE 10

A solution is prepared containing 1394 grams of a 17% copper nitrate solution and 689 grams of an 18% zinc nitrate solution. The solution is maintained at 55° C. under constant stirring. A saturated sodium carbonate solution is prepared by adding sodium carbonate to deionized water until saturation. The copper/zinc solution is blended with the sodium carbonate solution at a constant pH from about 7 to about 8. The material is added at about 55 milliliters per minute and is maintained at a temperature of about 60° C. under constant stirring to prevent rapid agglomeration. A sodium aluminate aqueous solution is prepared by blending 88 grams of sodium aluminate with water at a temperature of about 68° C. The solution is neutralized to a pH of between 6 and 9 by adding $CO_2$. The resulting aluminum component is blended with the copper/zinc solution. The mixture is maintained under agitation at 60° C. for 30 minutes. The resulting slurry is filtered, dried, calcined and formed into catalyst shapes following the description of Comparative Example 1.

INVENTIVE EXAMPLE 11

The process for the preparation of the catalyst of Inventive Example 10 is followed except that nitric acid is used in place of $CO_2$ to neutralize the sodium aluminate solution.

In order to determine the activity of the catalysts produced by the various examples, a feed stream containing 3% carbon monoxide, 17% carbon dioxide, 2% nitrogen with the balance hydrogen is prepared and passed over the prereduced catalysts with a steam to dry gas ratio of 1. For this reaction the feed stream is heated to 204° C. under 1 atmospheric pressure. Table 1 discloses the following information concerning the performance and characteristic of the catalyst of the Examples: the percentage conversion of carbon monoxide by the catalyst, the percentage of HTAl, and the copper surface area of the catalyst. The percentage of hydrotalcite aluminum and the copper surface area are computed utilizing the methods earlier described.

TABLE 1

|  | % CO | % HTAl | Cu SA $(m^2/g)^a$ |
|---|---|---|---|
| Comp. Ex. 1 | 75 | 0 | 13.8 |
| Comp. Ex. 2 | 71 | 95.9 | 21.8 |
| Comp. Ex. 3 | 69 | 99.8 | 22.5 |
| Comp. Ex. 4 | 66 | 82.8 | 22.4 |
| Inventive Ex. 5 | 76 | 37.8 | 24.2 |
| Inventive Ex. 6 | 85 | 33.0 | 25.8 |
| Inventive Ex. 7 | 87 | 17.8 | 28.7 |
| Inventive Ex. 8 | 73 | 50.0 | 24.3 |
| Inventive Ex. 9 | 80 | 8.0 | 24.0 |
| Inventive Ex. 10 | 87 | 31.6 | 26.2 |
| Inventive Ex. 11 | 86 | 28.3 | 27.3 |

$^a$Copper surface area (Cu SA) is reported as compared to grams catalyst.

a Copper surface area (Cu SA) is reported as compared to grams catalyst. The performance of the Examples is also shown in FIG. 1 which compares the activity of the catalysts with the copper surface area based on the percentage of the hydrotalcite aluminum in the precursor for the catalyst.

The Examples show that the largest conversion of carbon monoxide based on the quantity of the catalyst occurred when the quantity of the HTAl was less than about 60%, preferably from about 5% to about 45%, more preferably from about 10% to about 45% HTAl. This is surprising as the prior art taught that there was a direct relationship between the performance of a copper/zinc/aluminum low temperature shift catalyst and the quantity of the HTAl in the precursor with the higher the percentage of hydrotalcite in the precursor, the better the catalyst. In contrast, the data shows that lower quantities of hydrotalcite aluminum (preferably in the range of 10–45%) in the precursor material produce catalysts with better performance including significantly better conversion of carbon monoxide for low temperature shift reactions.

The Examples also show that there is a relationship between the copper surface area of the catalyst and the performance of the catalyst. Catalysts with low copper surface area (Comparative Example 1) show lesser performance than those with higher copper surface area such as Inventive Example 7. Further, higher performance of the catalysts occurred when the copper surface area was higher.

The principals, preferred embodiments and modes of operation of the present invention have been described in the foregoing specification. The invention which is intended to be protected herein, however, is not to be construed or limited to the particular terms of disclosure, as these are to be regarded as being illustrative rather than restrictive. Variations and changes may be made by those skilled in the art without departing from the spirit of the invention.

What is claimed is:

1. A low temperature water gas shift catalyst comprising from about 5 wt % to about 70 wt % copper oxide, from about 20 wt % to about 50 wt % zinc oxide and from about 5 wt % to about 50 wt % aluminum oxide, said catalyst being prepared from a precursor material comprising aluminum, wherein from about 1% to about 60% of said aluminum is intercalated in a hydrotalcite, wherein said hydrotalcite is defined as $(Cu, Zn)_6Al_2(OH)_{16}CO_3 \cdot 4H_2O$.

2. The catalyst of claim 1 wherein said precursor comprises from about 5% to about 45% of said aluminum is intercalated in hydrotalcite.

3. The catalyst of claim 1 wherein said precursor comprises from about 10% to about 45% of said aluminum is intercalated in hydrotalcite.

4. The catalyst of claim 1 further comprising a Group I-A oxide.

5. The catalyst of claim 1 further comprising a Group IV-B metal.

6. The catalyst of claim 5 wherein said Group IV-B metal is selected from titanium, zirconium or a combination thereof.

7. The catalyst of claim 1 wherein said catalyst further defines a surface area and said surface area is from about 40 $m^2/g$ to about 200 $m^2/g$.

8. The catalyst of claim 1 wherein said catalyst further defines a pore volume and said pore volume is from about 0.2 cc/g to about 0.4 cc/g.

9. The catalyst of claim 1 wherein said copper surface area is at least about 15 $m^2/g$.

10. A low temperature water gas shift catalyst comprising from about 5 wt % to about 70 wt % copper oxide, from about 20 wt % to about 50 wt % zinc oxide and from about 5 wt % to about 50 wt % aluminum oxide, said catalyst defining a copper surface area and said copper surface area being at least about 24 $m^2/g$, said catalyst being prepared from a hydroxycarbonate precursor comprising aluminum, wherein up to about 90% of said aluminum is intercalated in a hydrotalcite, said hydrotalcite defined as $(Cu, Zn)_6Al_2(OH)_{16}CO_3 \cdot 4H_2O$.

11. The catalyst of claim 10 further comprising a Group I-A oxide.

12. The catalyst of claim 10 further comprising a Group IV-B metal.

13. The catalyst of claim 12 wherein said Group IV-B metal is selected from titanium, zirconium or a combination thereof.

14. The catalyst of claim 10 wherein said catalyst further defines a surface area and said surface area is from about 40 $m^2/g$ to about 200 $m^2/g$.

15. The catatlyst of claim 10 wherein said catalyst further defines a pore volume and said pore volume is from about 0.2 cc/g to about 0.4 cc/g.

16. A low temperature water gas shift catalyst comprising from about 5 wt % to about 70 wt % copper oxide, from about 20 wt % to about 50 wt % zinc oxide and from about 5 wt % to about 50 wt % aluminum oxide, said catalyst defining a copper surface area and said copper surface area being at least about 22 $m^2/g$, said catalyst being prepared from a hydroxycarbonate precursor comprising aluminum, wherein up to about 70% of said aluminum is intercalated in a hydrotalcite, said hydrotalcite defined as $(Cu, Zn)_6Al_2(OH)_{16}CO_3 \cdot 4H_2O$.

17. The catalyst of claim 16 further comprising a Group I-A oxide.

18. The catalyst of claim 16 further comprising a Group IV-B metal.

19. The catalyst of claim 18 wherein said Group IV-B metal is selected from titanium, zirconium or a combination thereof.

20. The catalyst of claim 16 wherein said catalyst further defines a surface area and said surface area is from about 40 $m^2/g$ to about 200 $m^2/g$.

21. The catatlyst of claim 16 wherein said catalyst further defines a pore volume and said pore volume is from about 0.2 cc/g to about 0.4 cc/g.

22. A low temperature water gas shift catalyst comprising from about 5 wt % to about 70 wt % copper oxide, from about 20 wt % to about 50 wt % zinc oxide and from about 5 wt % to about 50 wt % aluminum oxide, said catalyst having a surface area of from about 40 $m^2/g$ to about 200 $m^2/g$, and having a pore volume of from about 0.2 cc/g to about 0.4 cc/g, and having a copper surface area of at least about 15 $m^2/g$, said catalyst being prepared from a hydroxycarbonate precursor comprising aluminum, wherein from about 1% to about 60% of said aluminum is intercalated in a hydrotalcite, said hydrotalcite defined as $(Cu, Zn)_6Al_2(OH)_{16}CO_3 \cdot 4H_2O$.

23. A low temperature water gas shift catalyst comprising from about 5 wt % to about 70 wt % copper oxide, from about 20 wt % to about 50 wt % zinc oxide and from about 5 wt % to about 50 wt % aluminum oxide, said catalyst resulting from mixing copper salts and zinc salts with at least one aluminum-containing component, to form a precursor material comprising a hydrotalcite, said hydrotalcite being defined as $(Cu, Zn)_6Al_2(OH)_{16}CO_3 \cdot 4H_2O$ and wherein from about 1% to about 70% of the aluminum from said aluminum-containing component is intercalated within said hydrotalcite, then forming said precursor material into shaped precursor catalyst bodies, and calcining the shaped precursor bodies.

24. The catalyst of claim 23 further including a Group I-A oxide.

25. The catalyst of claim 23 further including a Group IV-B metal.

26. The catalyst of claim 23 wherein the aluminum-containing component comprises an alumina, an ionic aluminum, or a combination thereof.

27. The catalyst of claim 26 wherein said ionic aluminum is an aluminum salt selected from the group consisting of aluminum nitrate, aluminum sulfate or a combination thereof.

28. The catalyst of claim 26 wherein said ionic aluminum is an aluminate.

\* \* \* \* \*